(12) United States Patent
Fails et al.

(10) Patent No.: US 8,910,979 B1
(45) Date of Patent: Dec. 16, 2014

(54) PIPE REPAIR COUPLING

(71) Applicants: Sidney T. Fails, Bassfield, MS (US);
Vickie L. Fails, Bassfield, MS (US)

(72) Inventors: Sidney T. Fails, Bassfield, MS (US);
Vickie L. Fails, Bassfield, MS (US)

( * ) Notice: Subject to any disclaimer, the term of this patent is extended or adjusted under 35 U.S.C. 154(b) by 0 days.

(21) Appl. No.: 14/229,177

(22) Filed: Mar. 28, 2014

(51) Int. Cl.
*F16L 55/18* (2006.01)
*F16L 55/168* (2006.01)

(52) U.S. Cl.
CPC .................................. *F16L 55/168* (2013.01)
USPC ................................ 285/15; 285/369; 138/97

(58) Field of Classification Search
USPC ................. 285/15, 373, 369; 138/97
See application file for complete search history.

(56) References Cited

U.S. PATENT DOCUMENTS

| | | | | |
|---|---|---|---|---|
| 1,853,411 | A * | 4/1932 | Gentry et al. | 285/342 |
| 2,478,684 | A * | 8/1949 | Brooks | 138/97 |
| 2,772,100 | A * | 11/1956 | Kreissig et al. | 285/93 |
| 3,051,514 | A * | 8/1962 | Consolloy | 285/215 |
| 3,409,314 | A * | 11/1968 | Roe | 285/18 |
| 3,711,126 | A * | 1/1973 | Hara et al. | 285/116 |
| 4,293,148 | A * | 10/1981 | Milberger | 285/90 |
| 5,460,416 | A * | 10/1995 | Freidrich et al. | 285/146.1 |
| 5,511,826 | A | 4/1996 | Clare et al. | |
| 5,538,297 | A * | 7/1996 | Mc Naughton et al. | 285/319 |
| 5,918,914 | A * | 7/1999 | Morris | 285/351 |
| 7,108,295 | B1 * | 9/2006 | Zarynow | 285/305 |
| 7,963,569 | B2 * | 6/2011 | Subbaraman et al. | 285/305 |
| 2009/0218810 | A1 | 9/2009 | Clare | |
| 2012/0306192 | A1 | 12/2012 | Spears | |
| 2013/0241191 | A1 | 9/2013 | Sackewitz | |

FOREIGN PATENT DOCUMENTS

WO       WO 99/40355       8/1999

* cited by examiner

*Primary Examiner* — James Hewitt
(74) *Attorney, Agent, or Firm* — Richard C Litman

(57) ABSTRACT

The pipe repair coupling includes a sleeve and two seal retainers that secure to the sleeve ends to retain corresponding seals therein. The repair coupling is installed about a damaged section of pipe without need for substantial displacement of either portion of the broken pipe or need to dress or otherwise modify the broken ends of the pipe. A seal retainer and seal are placed over each portion of the broken pipe, and the sleeve is slipped over one of the broken pipe portions. The two pipe portions are aligned with one another, and the sleeve is generally centered over the break. The two seal retainers are then locked into place on the sleeve ends by splines inserted into cooperating circumferential grooves in the sleeve ends and retainers, capturing the seals between the seal retainers and corresponding seats and distending the seals to bear against the broken pipe therein.

5 Claims, 4 Drawing Sheets

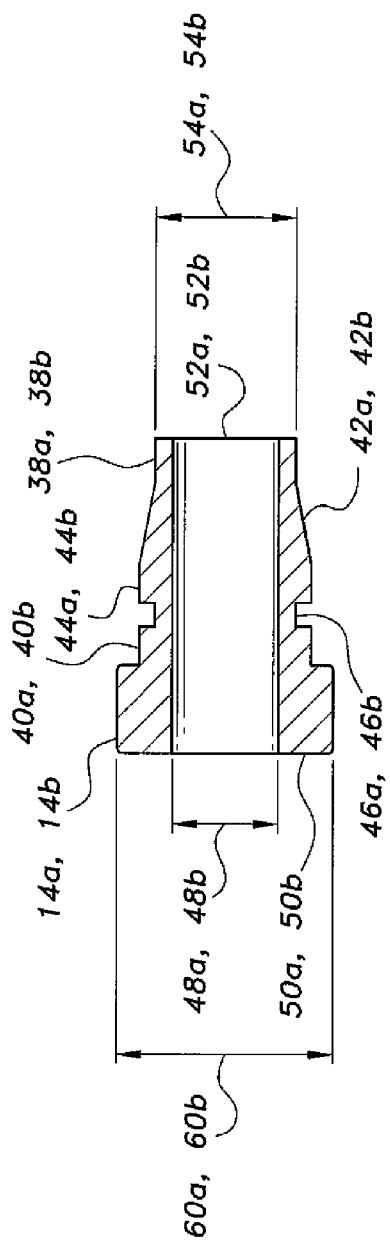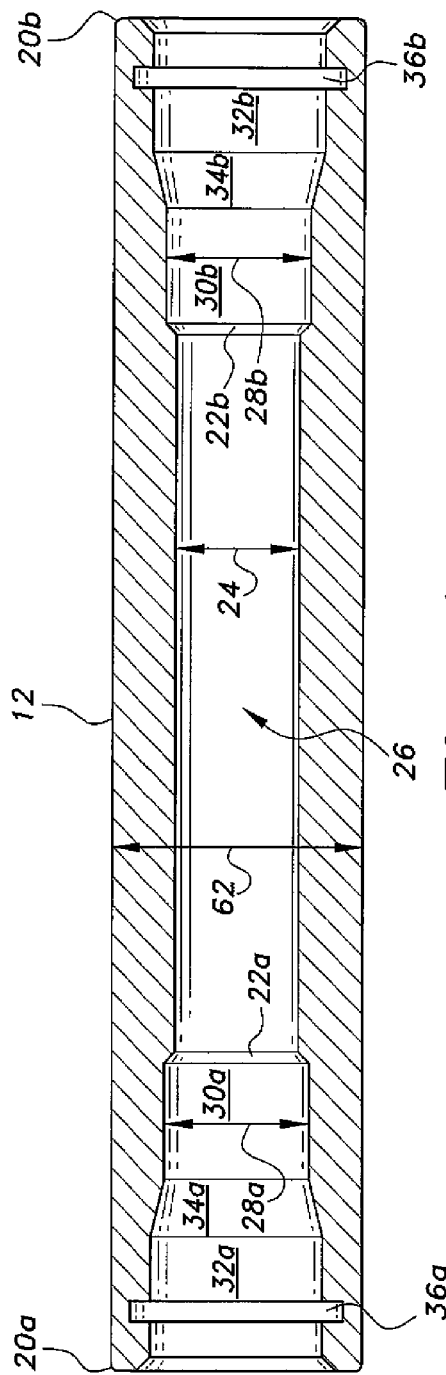

PIPE REPAIR COUPLING

BACKGROUND OF THE INVENTION

1. Field of the Invention

The present invention relates generally to plumbing pipes, tubes, and fluid conveyance systems, and particularly to a pipe repair coupling for the effective repair of polyvinyl chloride (PVC) and similar plastic pipes.

2. Description of the Related Art

Plastic pipe, and particularly polyvinyl chloride (PVC) plastic, has become increasingly popular for installation in household, commercial, and other water supply lines. While such plastic material has its limitations insofar as high temperatures are concerned, it has many advantages over metal pipe and tubing for use as water supply and drain pipe, such as economy, ease of installation, resistance to corrosion, and lack of toxicity.

Nevertheless, such PVC pipe is still subject to damage under certain conditions. Freezing temperatures that allow water within the pipe to freeze and expand may cause the pipe to split. Buried pipe may be damaged by excavation for construction, tree roots, and/or other causes. Obviously, when such damage occurs, it must be repaired.

Accordingly, a number of plastic pipe repair devices and systems have been developed in the past. Many, if not most, such repair devices and systems require that at least one end of the broken pipe be displaced laterally from its alignment with the pipeline. Plastic pipe is reasonably flexible and may accommodate a certain amount of bending to allow for the installation of the repair components. However, the use of many such repair components requires that a considerable amount of material be removed along the length of a buried pipe in order to allow sufficient movement of the pipe for the installation of the repair components without damaging the pipe further. This clearly adds to the difficulty of the repair, particularly if the pipe is encased in concrete or other extremely hard material. Other repair systems require that the ends of the pipe be dressed, grooved, or treated in some manner, which is extremely difficult to perform in a buried pipeline installation. Moreover, many such pipe repair systems result in permanent installations that cannot be removed, repositioned or resealed should circumstances require.

Thus, a pipe repair coupling solving the aforementioned problems is desired.

SUMMARY OF THE INVENTION

The pipe repair coupling is an assembly comprising a central coupling body or sleeve and first and second seal retainers that are secured to the ends of the central sleeve to retain corresponding seals therein. The repair coupling may be installed about a damaged section of PVC or other hard plastic pipe without the need for substantial displacement of either portion of the broken pipe or the need to dress or otherwise modify the broken ends of the pipe.

The coupling body or sleeve has a smooth, continuous central bore that is unbroken by any stops or other discontinuities therein. The broken pipe is installed through the bore of the sleeve. Each end of the sleeve has a larger internal diameter than the central bore to accommodate a seal and the tubular extension of a seal retainer installed thereon. Each end of the sleeve also has a circumferential internal groove to accept a locking spline, as explained below.

Each seal retainer has a circumferential external groove. The groove at each end of the sleeve aligns with the corresponding groove of the seal retainer to define a circumferential spline channel when the components are properly assembled. A locking spline is inserted into each spline channel through a passage in the outer wall of the sleeve at each end thereof. This locks each seal retainer in place in the respective ends of the sleeve. The locking splines may be removed to allow the seal retainers to be removed in order to remove or reposition the assembly as desired, e.g., for replacement of the seals therein.

An O-ring or other suitable resilient elastomer seal is captured between the end of the extension of each seal retainer and the face of the smaller diameter central bore of the sleeve. When the pipe is pressurized with water or other fluid, the fluid pressure is transmitted through the broken section of pipe between the pipe and the surrounding sleeve to bear against the inner face of the seal. This forces the seal outward against the end of the extension of the seal retainer and distends the seal to force it both inward against the pipe and outward against the inner surface of the sleeve to provide a positive seal.

The present pipe repair coupling is quickly and easily installed. No tools or equipment are required once the damaged section of pipe is accessed, except that a hammer or other suitable impact tool may be needed to drive the gasket or seal into place during assembly. It may be necessary to completely separate the pipe at the break if the pipe still forms a continuous length. This may be done with any suitable tool, e.g., breaking the pipe with a shovel blade, etc., as the condition of the broken ends of the pipe is acceptable so long as the ends fit within the sleeve. One of the seal retainers and a seal are then placed over each portion of the pipe, i.e., to each side of the break, and the sleeve is placed over one of the portions of the pipe. The two sections of pipe are aligned with one another and the sleeve is slid back over the break in the pipe, positioning the break at approximately the midpoint of the sleeve. Each seal retainer is then pushed into an end of the sleeve or coupling to the extent that its external groove aligns with the corresponding internal groove of the sleeve. A locking spline is then inserted through the external hole or passage in each end of the coupling or sleeve, and pushed through the hole or passage to wrap around the retainer in the circumferential channel formed by the internal and external grooves of the sleeve and retainer. This locks the retainer in place in the end of the sleeve or coupling, and forces the seal into position between the end of the tubular extension of the seal retainer and the face of the smaller diameter central bore of the sleeve to complete the pipe repair.

These and other features of the present invention will become readily apparent upon further review of the following specification and drawings.

BRIEF DESCRIPTION OF THE DRAWINGS

FIG. 3 is an elevation view in section of one of the seal retainer components of the pipe repair coupling according to the present invention, illustrating various details thereof.

FIG. 4 is an elevation view in section of the coupling body of the pipe repair coupling according to the present invention, illustrating various details thereof.

Similar reference characters denote corresponding features consistently throughout the attached drawings.

DETAILED DESCRIPTION OF THE PREFERRED EMBODIMENTS

Figure 1:
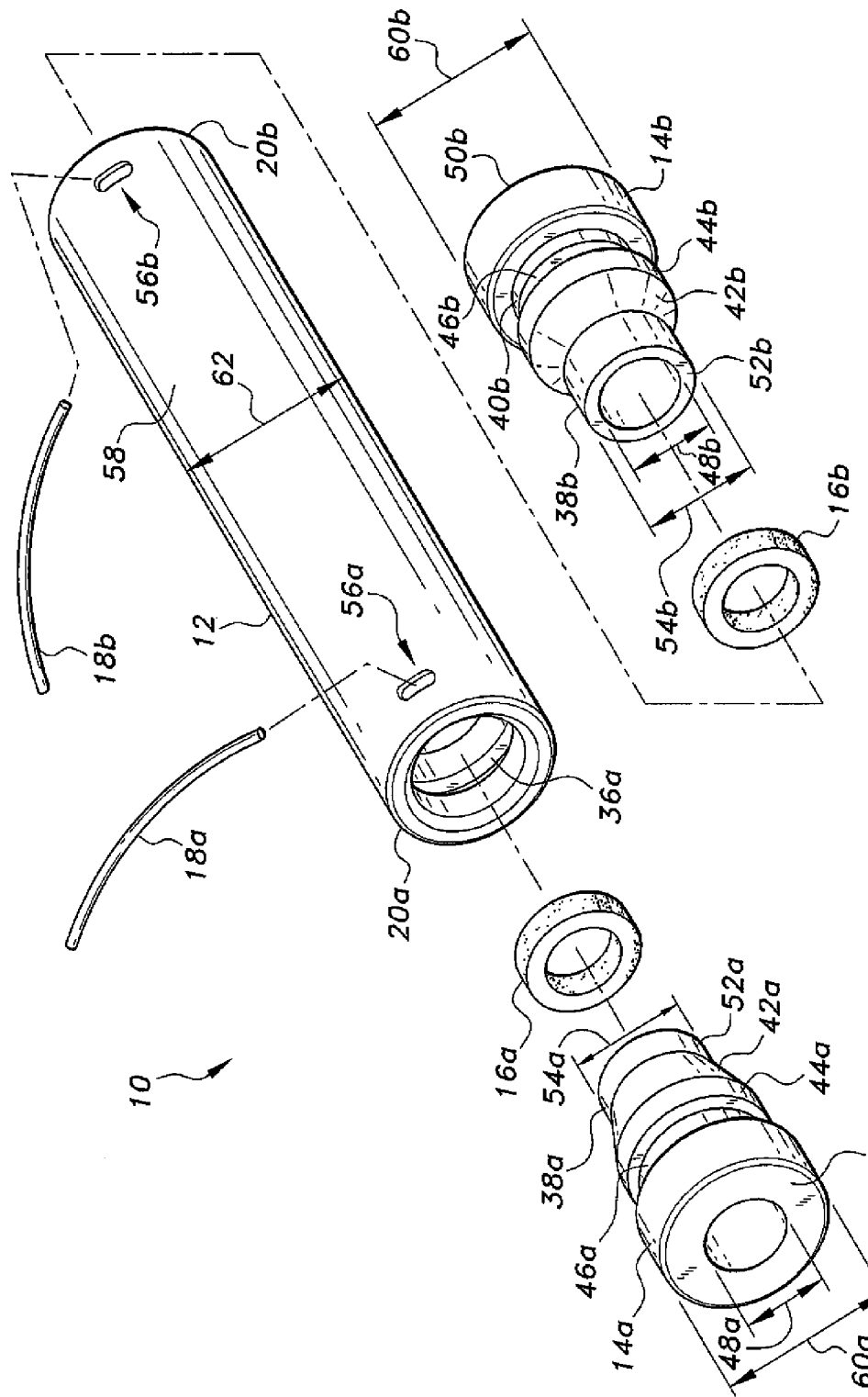
FIG. 1 is an exploded perspective view of a pipe repair coupling according to the present invention, illustrating its components.
Figure 2:
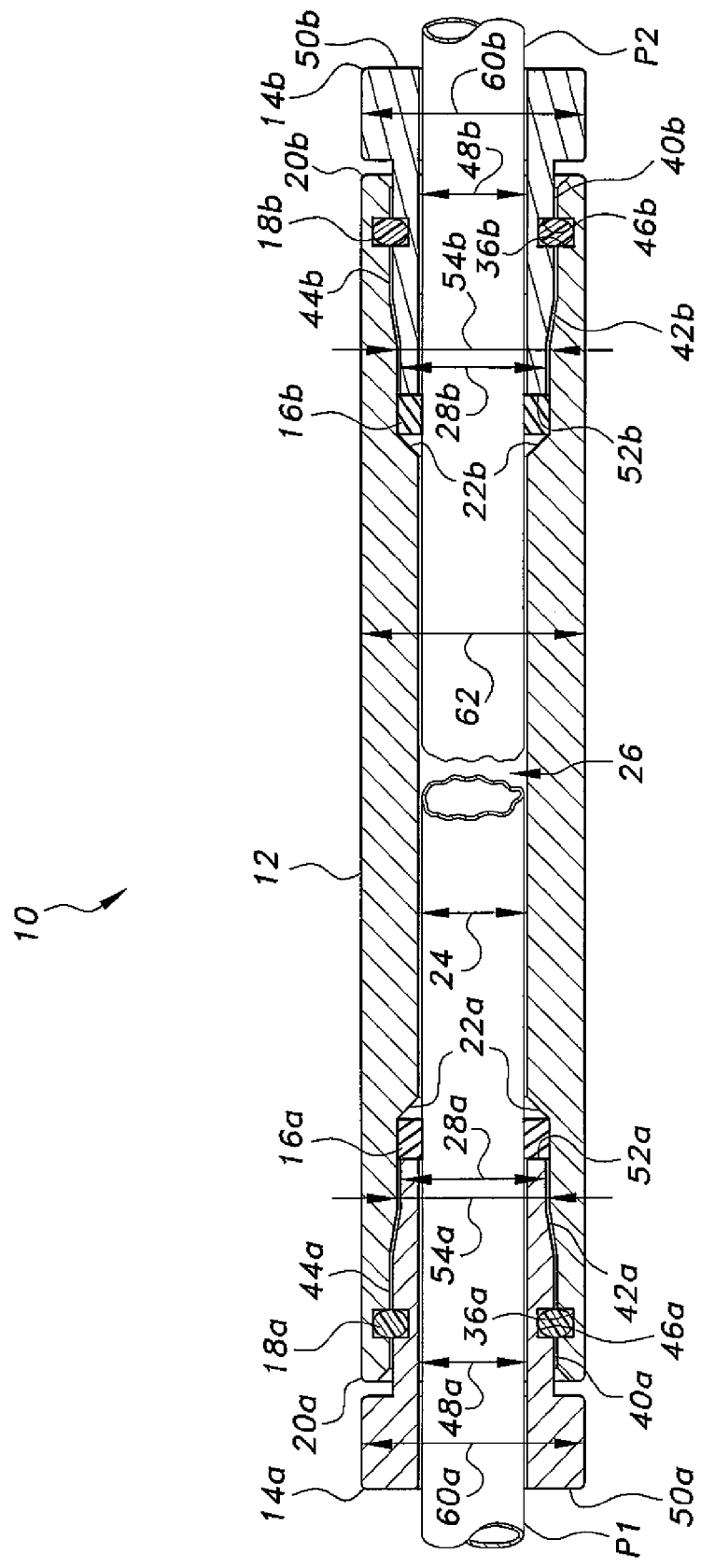
FIG. 2 is an environmental elevation view in section of the pipe repair coupling according to the present invention, showing the pipe repair coupling assembled along a broken pipe.
Figure 5:
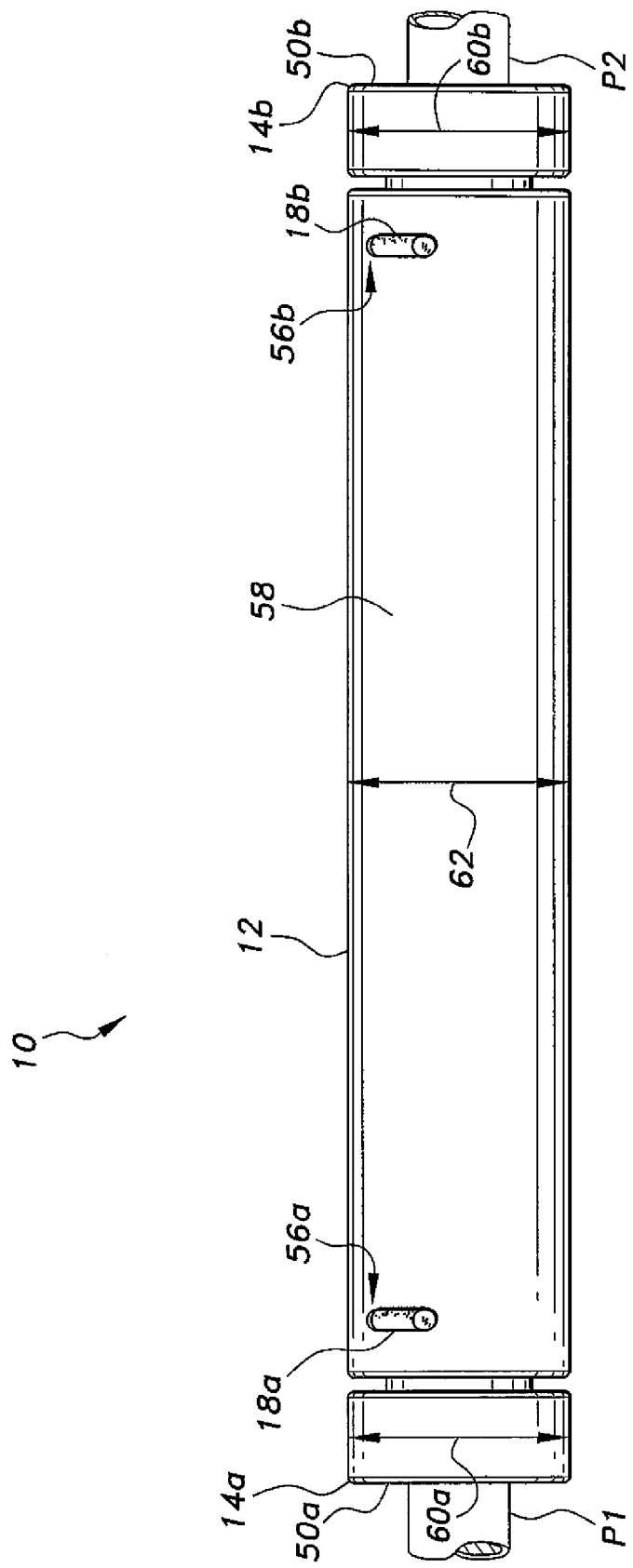
FIG. 5 is an environmental elevation view of the pipe repair coupling according to the present invention, showing the completed pipe repair coupling assembly installed upon a broken pipe.

The pipe repair coupling provides for the repair of broken or damaged PVC or other hard plastic pipe without the need for assembly tools, pipe cement, or other ancillary tools and/or equipment. The pipe repair coupling is configured to allow its components to be separated and reassembled without damage, thereby allowing the coupling to be reused and/or for deteriorated seals to be replaced. FIG. 1 of the drawings provides an exploded perspective view of the components of the pipe repair coupling 10, FIG. 2 provides a view in section of the coupling 10 connecting two broken pipe sections P1 and P2 to one another, and FIG. 5 provides an external view of the installed coupling 10 on the pipe sections P1 and P2. The coupling 10 includes seven basic components: a cylindrical sleeve 12; first and second seal retainers 14a and 14b; first and second seals 16a and 16b that are secured in the opposite ends of the sleeve 12 by the seal retainers 14a and 14b; and first and second flexible splines 18a and 18b that serve to lock the seal retainers to the ends of the sleeve. The sleeve 12 and the two seal retainers 14a, 14b are preferably formed of a durable plastic, such as high-density polyethylene (HDPE), although other suitable materials may be used. The two seals 16a, 16b are preferably formed of a resilient material, such as silicone rubber, although other materials may be used. The two splines 18a, 18b may be formed of any suitable flexible material, such as Nylon® or other plastic material, flexible wire, etc. The splines 18a, 18b may have circular cross sections, as shown, or alternatively, may have any other suitable non-circular cross section.

FIGS. 2 and 4 provide views in section showing the internal configuration of the sleeve 12. The sleeve 12 is laterally and axially symmetrical, having mutually opposed first and second ends 20a and 20b. Annular seal seats, respectively 22a and 22b, are disposed within the respective sleeve ends 20a and 20b. Each of the seal seats 22a, 22b has a frustoconical section, as can be seen by the tapering shape of the seats in the two sectional views of FIGS. 2 and 4. The minor diameters of the seal seats 22a, 22b are equal to the internal diameter 24 of the through bore or passage 26 that extends axially through the length of the sleeve 12, and the major diameters of the seal seats are equal to the internal diameters 28a, 28b of the seal retainer receptacles 30a and 30b (shown in FIG. 4) formed at each end of the through bore 26.

Larger diameter portions 32a and 32b are formed immediately within the extreme ends of the sleeve 12. These larger diameter end portions 32a, 32b provide greater clearance for the initial insertion of the seals 16a and 16b before the seals reach the narrower diameter seal retainer receptacle areas 30a and 30b. These larger diameter portions 32a, 32b are configured to fit closely around the intermediate portions of the seal retainers 14a, 14b between their outermost and innermost ends. A shallow frustoconical portion 34a, 34b extends between the larger diameter end portions 32a, 32b and the seal retainer receptacles 30a, 30b, to provide a smooth transition between the two diameters. Internal spline retaining grooves, respectively 36a and 36b, are formed circumferentially in the larger diameter portions 32a, 32b immediately within each of the two sleeve ends 20a and 20b. The spline retaining grooves 36a, 36b may have rectangular cross sections as shown, or may have some other cross-sectional shape.

The seal retainers 14a, 14b are shown installed in the sleeve ends 20a, 20b in FIG. 2, and as a separate component in FIG. 3. It will be understood that the two seal retainers 14a, 14b are identical to one another. The seal retainer depicted in FIG. 3 may represent the second seal retainer 14b by inverting the image or reversing the image to form a mirror image. Each of the seal retainers 14a, 14b has an external shape that mates closely with the internal shape of each end of the sleeve 12, i.e., each seal retainer 14a, 14b has a tubular extension 38a, 38b; an intermediate portion 40a, 40b having a larger diameter than the extension 38a, 38b; and a shallow frustoconical portion 42a, 42b between the extension and intermediate portion. The tubular extensions 38a, 38b seat within the seal retainer receptacles 30a, 30b of the sleeve 12 when the seal retainers 14a, 14b are installed therein. The frustoconical portions 42a, 42b of the seal retainers seat closely within the corresponding frustoconical portions 34a, 34b in the sleeves, and the larger diameter intermediate portions 40a, 40b of the seal retainers 14a, 14b seat closely within the corresponding larger diameter portions 32a, 32b immediately within each of the ends 20a and 20b of the sleeve 12.

The intermediate portions 40a, 40b of the two seal retainers 14a, 14b may be more specifically described as having flanges 44a, 44b at the ends of the larger diameters of their frustoconical portions 42a, 42b. These flanges define smaller diameter circumferential spline retaining grooves 46a, 46b disposed between each flange and the respective larger diameter outer ends 44a, 44b of the seal retainers. These spline retaining grooves 46a, 46b are formed externally about each of the seal retainers 14a, 14b and align with the corresponding internal grooves 36a, 36b of the sleeve 12 to form spline channels (or annular keyways) when the seal retainers 14a, 14b are properly installed with the sleeve 12. The spline retaining grooves 46a, 46b, and the channels formed by the aligned internal spline retaining grooves 36a, 36b of the sleeve 12 may have rectangular cross sections, as shown particularly in FIGS. 2 and 3, or may have any other suitable cross section.

The sleeve 12 has a smooth, continuous concentric bore or pipe passage 26 formed axially therethrough as noted further above, shown most clearly in FIG. 4. The pipe repair coupling 10, and particularly the internal diameter 24 of the bore 26, is capable of being adapted to different pipe diameters. The bore 26 is devoid of any pipe stops or other discontinuities therein, permitting a length of pipe P1 or P2 to be passed completely through the sleeve 12. The tubular extensions 38a and 38b of the seal retainers 14a and 14b have internal diameters 48a and 48b substantially identical to the internal diameter 24 of the bore or passage 26 of the sleeve 12. The larger internal diameters 28a, 28b of the seal retainer receptacles 30a, 30b of the sleeve 12 form the annular frustoconical seal seats 20a and 20b with the smaller internal diameter 24 of the bore 26 of the sleeve 12, as noted further above.

The toroidal seals or gaskets 16a and 16b, e.g., resilient elastomer O-rings or the like, are installed within the respective seal retainer receptacles 30a and 30b of the sleeve 12. The material of which the two seals 16a, 16b are formed is preferably an NSF-approved elastomer suitable for use with pipes carrying potable water, although other materials may be used, where suitable. The seals 16a and 16b preferably have rectangular cross-sections, as shown in FIG. 1, and particularly in the cross-sectional view of FIG. 2. However, the two seals 16a, 16b may be provided with other cross-sectional shapes. The larger internal diameter portions 32a, 32b of the seal retainers 14a and 14b between their outer ends 50a and 50b and their tapering frustoconical intermediate portions 42a, 42b provide clearance for the seals 16a and 16b to facilitate their insertion into the seal retainers. The seals 16a and 16b preferably fit closely within the smaller internal diameter seal retainer receptacles 30a, 30b.

As the tubular extensions 38a and 38b of the two seal retainers 14a and 14b are inserted into their respective retainer receptacles 30a and 30b of the sleeve 12, the seals or gaskets 16a and 16b are compressed between the frustoconical seal seats 22a and 22b of the sleeve 12 and the seal retaining ends 52a and 52b of the tubular extensions 38a and 38b of the seal retainers 14a and 14b, so that the outer diameters 54a, 54b of the extensions 38a, 38b are substantially equal to and fitting closely within the internal diameters 28a, 28b of the respective seal retainer receptacles 30a and 30b of the sleeve 12. As the seals 16a, 16b are compressed further, the frustoconical slopes of the two seal seats 20a, 20b force the seals to flow inward to press against the outer walls of the two pipe sections P1 and P2, thereby forming a leakproof seal against the pipe sections.

The leakproof seal is retained by pressing the two seal retainers 14a, 14b into the respective ends 20a and 20b of the sleeve 12 until each of the spline retaining grooves 46a and 46b of the retainers align with the respective spline retaining grooves 36a and 36b of the sleeve 12 to form or define first and second spline retaining channels. The two flexible splines 18a, 18b (or keys) are then inserted into their respective spline retaining channels (or annular keyways) through the first and second spline access holes or passages 56a and 56b formed through the outer surface or wall 58 of the sleeve 12, each of the spline access passages 56a, 56b being aligned with the respective grooves 36a, 36b and thus with the channels formed when those grooves 36a, 36b are aligned with the seal retainer grooves 46a and 46b. This completes the assembly process, holding the two seals 16a, 16b firmly in their respective seats 22a, 22b within the sleeve 12 with the seal retaining ends 52a, 52b of the two seal retainers 14a, 14b exerting sufficient pressure on the seals to distend the seals against the sides of the pipe P1, P2 and inner diameters 28a, 28b of the seal retainer receptacles 30a, 30b to seal fluids flowing within the pipe P1, P2 and pipe repair coupling 10.

It will be noted that the external diameters 60a and 60b of the outer ends 38a and 38b of the two seal retainers 14a and 14b are substantially equal to the external diameter 62 of the sleeve 12. The sleeve 12 is constructed to have a minimum external diameter 62 based upon the required thickness of the material between the two spline retaining grooves 36a, 36b and the outer diameter 62. This sleeve diameter 62 is preferably uniform throughout the entire length of the sleeve 12. The uniform diameter 62 of the sleeve 12 and the substantially equal diameters 60a and 60b of the two seal retainers 14a and 14b provide a smooth external surface for the pipe repair coupling assembly 10 to preclude or at least greatly reduce the chances of the device catching upon some external object during installation.

Accordingly, the pipe repair coupling 10 provides a much easier means of repairing a broken PVC or other similar plastic pipe. The pipe repair coupling 10 does not require any specialized tools or equipment for installation, as the two seal retainers 14a and 14b merely slide into place in the respective ends 20a and 20b of the sleeve 12. Under some circumstances, a hammer or other suitable impact tool may be required to seat the gaskets or seals in place during assembly of the repair coupling 10 on the pipe. Further, the pipe components or sections P1 and P2 do not require further work in preparation for installing the coupling 10, other than completely separating the two sections at the break point as necessary so that the sleeve 12, the two seal retainers 14a and 14b, and their seals 16a and 16b may be slipped over the pipe sections. The relatively small diameter of the repair coupling 10, i.e., on the order of twice the diameter of the pipe sections P1 and P2, requires minimal lateral displacement of either of the pipe sections for installation of the coupling, thereby further reducing the time and effort required for installation.

Moreover, the ability to remove either or both of the two splines 18a, 18b to remove either or both of the seal retainers 14a, 14b allows the respective seal(s) 16a and/or 16b to be accessed for replacement, should such become necessary after the initial installation of the pipe repair coupling 10. The outer ends of the two splines 18a, 18b may be left to protrude slightly from their respective spline access passages 56a, 56b in the sleeve 12, as shown in FIG. 5, to facilitate their future access should disassembly of the pipe repair coupling 10 be desired. In fact, the entire pipe repair coupling 10 may be removed from the damaged section of pipe P1, P2 should that damaged section be replaced with new pipe, and the pipe repair coupling retained for future reuse as needed. The result will be much appreciated by anyone who has occasion to repair a broken plastic pipe.

It is to be understood that the present invention is not limited to the embodiments described above, but encompasses any and all embodiments within the scope of the following claims.

We claim:

1. A pipe repair coupling, comprising:
a cylindrical sleeve having an outer surface, a smooth, threadless inner surface and mutually opposed first and second ends, each of the first and second ends having an annular frustoconical seal seat, an adjacent first diameter portion, a frustoconical portion longitudinally adjacent the first diameter portion, a second diameter portion longitudinally adjacent the frustoconical portion and extending to their respective ends, the second diameter being larger than the first diameter, and a circumferential internal spline-retaining groove disposed circumferentially in the second diameter portion, the sleeve further having first and second spline access passages extending from the outer surface to the corresponding spline-retaining groove;
first and second threadless seal retainers, each of the seal retainers having an outer end, wherein the outer end is formed with a first diameter, a tubular extension defining a seal-retaining end opposite the outer end, the tubular extension defining a second diameter, a frustoconical portion longitudinally adjacent the tubular extension, a third diameter portion longitudinally adjacent the frustoconical portion, the second diameter being larger than the third diameter and smaller than the first diameter, and a circumferential external spline-retaining groove disposed about the second diameter portion, the spline-retaining groove of the sleeve aligning with the corresponding spline-retaining groove of the retainer to define a spline-retaining channel when the retainers are assembled with the sleeve;
first and second flexible splines, each of the splines being selectively disposed within the corresponding spline-retaining channel of the sleeve and retainer when the sleeve and retainers are assembled with one another; and
a toroidal seal captured between the seal-retaining end of each of the seal retainers and the corresponding frustoconical seal seat of the sleeve when the sleeve and retainers are assembled with one another.

2. The pipe repair coupling according to claim 1, wherein:
the sleeve has an external diameter; and
the first diameter of the outer end of each of the seal retainers is substantially equal to the external diameter of the sleeve.

3. The pipe repair coupling according to claim 1, wherein:
the circumferential external groove of each of the seal retainers has a substantially rectangular cross section; and
the circumferential internal grooves of the ends of the sleeve have substantially rectangular cross sections.

4. The pipe repair coupling according to claim 1, wherein each of the toroidal seals has a substantially rectangular cross section.

5. The pipe repair coupling according to claim 1, wherein each of the splines has a substantially circular cross section.

* * * * *